Jan. 23, 1945.  A. LANGER  2,367,949
RADIOMETRIC TITRATION METHOD
Filed Nov. 23, 1940

WITNESSES:

INVENTOR
Alois Langer.
BY
ATTORNEY

UNITED STATES PATENT OFFICE 2,367,949

RADIOMETRIC TITRATION METHOD

Alois Langer, Forest Hills, Pa., assignor to Westinghouse Electric & Manufacturing Company, East Pittsburgh, Pa., a corporation of Pennsylvania Application November 23, 1940, Serial No. 366,888

8 Claims. (Cl. 23—230)

My invention relates to apparatus and methods for carrying out chemical analyses, and has particular relation to end point determinations.

In determining the quantities of various chemicals which may be present in a substance under observation, precipitates containing the chemicals are formed by adding measured quantities of various reagents to a solution of the substance. The quantity of any chemical present in the solution is calculated from the quantity of the corresponding reagent on the basis of the chemical equations governing the precipitate reaction. In carrying out the calculations, the quantity of reagent required to completely precipitate a chemical from a solution must be known accurately. The reagent is customarily added to the solution in small increments until the precipitation is complete. As the reagent is added more and more solid is precipitated until a point is reached at which the small increment of reagent added passes into solution and does not produce a precipitate. This point is defined as the end-point of the reaction.

In accordance with the teaching of the prior art of which I am aware, the end-point may be determined visually by observing when no further precipitation occurs on the addition of a reagent or by noting a change in the color or composition of the liquid. It may also be determined by observing whether the resultant solution is basic or acid, and for this purpose electrical methods may be used. Prior art methods of determining end-point in general require a substantial quantity of the substance under observation as they do not apply, conveniently, where only weak solutions are available.

It is an object of my invention to provide a method for accurately determining the end-point of a reaction.

Another object of my invention is to provide a facile precision method for determining the end-point of a reaction.

A further object of my invention is to provide a reliable method for determining the end-point of a reaction involving weak solutions.

A still further object of my invention is to provide simple and inexpensive apparatus for making end-point determinations.

An ancillary object of my invention is to provide a device for accurately measuring the radioactivity of a liquid.

In accordance with my invention, the end-point of a reaction is determined by observing the changes in the radioactivity of one of the resultants of the reaction. Preferably the resultant solution is used.

In the analyses most frequently encountered, the original solution does not contain a radioactive element. A radioactive reagent is utilized in this case in the practice of my invention. The reagent is added to the solution by small increments and the radioactivity of the resultant solution is measured. As long as the reagent constitutes a portion of the precipitate which is brought down, the liquid is not radioactive. The liquid only became radioactive when no further precipitate is produced, i. e., when the end-point is reached.

On occasions the element in the original solution which is to be precipitated is radioactive or may be made radioactive. In such an event a non-radioactive reagent may be added. The radioactivity of the solution then decreases as the radioactive element is precipitated until at the end-point it contains no appreciable amount of the radioactive component, and the radioactivity indication becomes zero.

Where the original solution and the reagent are both radioactive the end-point is observed by noting when the addition of an increment of reagent no longer results in a decrease in the observed radioactivity but in an increase.

If neither the reagent nor the solution under observation are originally radioactive, one or the other may be rendered radioactive by the addition of a small quantity of a radioactive element which takes part in the reaction. The radioactive element must, of course, be added in such a way that it is homogeneously distributed throughout the reagent or the solution. For example, if the reagent is a non-radioactive solution, the radioactive element must be added in a compound which passes into solution. The same situation arises when the solution under observation is to be made radioactive.

The novel features that I consider characteristic of my invention are set forth with particularity in the appended claims. The invention, itself, however, both as to its organization and its methods of operation, together with additional objects and advantages thereof, will best be understood from the following description of a specific embodiment when read in connection with the accompanying drawing, in which:

Figure 1:
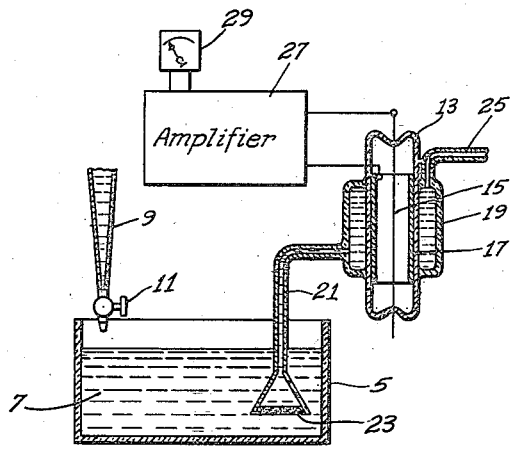
Figure 1 is a diagrammatic view of a preferred embodiment of my invention.

The apparatus shown in the drawing comprises a container 5 in which the solution 7 under observation is disposed. The solution 7 may take any convenient form. The solvent may be water or any other liquid organic or inorganic. The solution may also be in the form of a melt. If the latter is the situation, the container and the other apparatus used are necessarily refractory. The reagent is added to the solution in measured small quantities from a suitable graduated buret 9 provided with a stop cock 11 for controlling the flow of the reagent.

While the radioactivity of any resultant component of the analysis may be measured, the preferred practice in accordance with my invention is to measure the resultant liquid as this procedure does not involve segregation of the precipitate. The measurement is preferably made by observing the ionization produced by radioactive disintegration in a gas at a low pressure. For this purpose, I provide an evacuated tube 13 preferably of cylindrical structure containing an inert gas such as argon, at a pressure of the order of ten centimeters of mercury. The pressure of the inert gas is not critical and may vary over a relatively wide range. However, a sufficient quantity of the gas is required to assure that ionization occurs when a detectable radioactive disintegration takes place. A wire 15 extends longitudinally through the tube and is encircled by a conducting shell 17, which may be mounted in engagement with the wall of the container 13 or may be a coating on the wall of the container.

The container is enclosed by a jacket 19 which preferably, but not necessarily, completely encircles it. Near one end a tube 21, which I may designate as the in-flow tube, extends from the jacket 19 in communication with it. The tube 21 is widened at its extending end so that it has the form of a funnel and the mouth of the funnel is closed by a porous plug 23 pervious to the liquid of the solution but not to any precipitate. In the practice of my invention, the plugged end of the tube 21 dips into the solution. At the opposite end, the jacket is provided with a second communicating tube 25, which is open to the atmosphere. By exhausting the air from the jacket through the second tube 25, the liquid 7 is drawn into the jacket 19 through the plug 23 in the in-flow tube 21 and completely encircles the shell 17.

A potential is impressed between the shell 17 and the wire 15, and when radioactive reactions produce ionization in the container, current impulses flow between the shell and the wire. The impulses are impressed in the input circuit of a thermionic amplifier 27 and the output of the amplifier energizes a meter 29. The meter may indicate the rate at which the ionization impulses are produced or its indicator may merely "kick" to indicate that an ionization impulse has been produced. In the latter case, the observer may determine the rate by timing the "kicks." In either case, a measurement of the radioactivity is attained by observing the rate at which the impulses are produced.

Thus, a measurement of the radioactivity of the solution is made by drawing liquid from the container 5 into the jacket 19 and observing the rate at which the ionization impulses are produced. As previously indicated, such a measurement is made after each addition of the reagent to the solution, the liquid being returned from jacket 19 to the container 5 before the next addition of the reagent, so that a plurality of meter indications is obtained. The indications of the meter are then plotted as the reagent is added in small increments, and the end-point is determined by observing for what quantity of reagent the critical point in the curves occurs.

In measuring the radioactivity, the readings should, of course, be corrected for the increased volume produced by adding the reagent. The actual radioactivity is given by the equation:

$$\text{Actual activity} = \text{measured activity} \times \frac{\text{Original volume} + \text{added reagent volume}}{\text{Original volume}}$$

Figure 2:
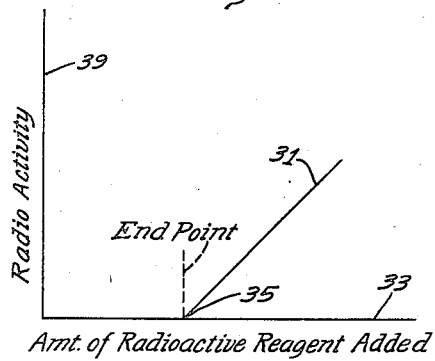
Fig. 2 is a graph showing how the end-point is determined when the reagent only is radioactive.
Figure 3:
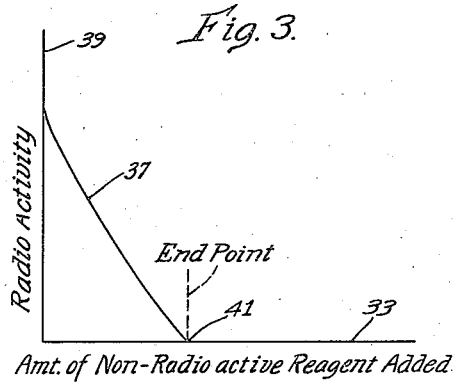
Fig. 3 is a graph showing how the end-point is determined when the original solution only is radioactive.
Figure 4:
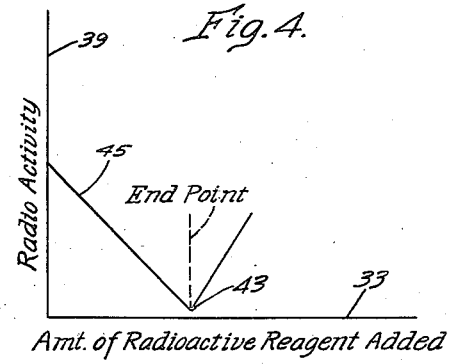
Fig. 4 is a graph showing how the end-point is determined when both the reagent and the original solution are radioactive.

Typical curves are reproduced in Figs. 2, 3 and 4.

If the original solution is not radioactive and the reagent is radioactive, the reagent, when it is first added, passes into the precipitate. Therefore, the resultant liquid is originally non-radioactive. The end-point is reached when the liquid becomes radioactive. The situation is exemplified in analyzing for chlorine, for example, in a potassium chloride solution by adding silver nitrate which contains radioactive ions of silver. The addition of the silver nitrate precipitates silver chloride. The end-point is reached when the solution contains no more chloride to precipitate the silver radical. At this point the solution is rendered radioactive by the presence of the radioactive ions of silver.

The plot for determining the end-point where the reagent is radioactive and the original solution is non-radioactive is reproduced in Fig. 2. Radioactivity is plotted vertically and the quantity of radioactive reagent is plotted horizontally. The resultant graph 31 initially extends along the abscissa 33. For a certain quantity of reagent, it rises above the axis. The end-point is the point 35 where the graph is just above the abscissa.

The plot for an originally radioactive solution and a non-radioactive reagent is reproduced in Fig. 3. In this case, the radioactivity first decreases until at the end-point it disappears because the radioactive element has passed completely into the precipitate. The corresponding graph 37 extends from a point along the ordinate 39 to a point 41 along the abscissa 33 and then extends along the abscissa. The end-point is the point 41 at which the graph 37 meets the abscissa 33. The reaction which is represented may be illustrated by the analysis of a silver nitrate solution containing a radioactive silver isotope for silver by adding potassium chloride. The silver including the radioactive component is precipitated as silver chloride.

The situation, when both the reagent and the original solution are radioactive, may be illustrated by the analysis for uranium of uranyl nitrate ($UO_2(NO_3)_2$) in an ammonium chloride solution by the addition of a reagent, sodium phosphate ($Na_2HPO_4$). The resultant precipitate is given by the formula $UO_2NH_4PO_4$. The uranium is in this case, of course, radioactive and the phosphorus in the reagent is radioactive. In such an event the radioactivity initially decreases as the reagent is added until the uranium has been completely precipitated. At this point the radioactivity is small. Addition of another increment of the sodium phosphate increases the radioactivity. The end-point is that point 43 of the graph 45 shown in Fig. 4 where the graph just begins to represent an increasing function.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. The method of determining the end-point of a reaction when a solution is subjected to the influence of a reagent, at least one of the components of the reaction being radioactive, which comprises mixing small increments of said reagent with said solution and measuring the radioactivity of one of the resultants of the reaction after each increment is added to determine a point at which an abrupt change in said radioactivity occurs.

2. The method of determining the end-point of a reaction when a solution is subjected to the influence of a reagent which comprises adding a small quantity of a radioactive ions of one of the elements involved in the reaction to the substance in which said element is originally present, mixing small increments of said reagent with said solution and measuring the radioactivity of one of the resultants of the reaction after each increment is added to determine a point at which an abrupt change in said radioactivity occurs.

3. The method of determining the end-point of a reaction when a solution is subjected to the influence of a radioactive reagent which comprises mixing small increments of said reagent with said solution and measuring the radioactivity of one of the resultants of the reaction after each increment is added to determine a point at which an abrupt change in said radioactivity occurs.

4. The method of determining the end-point of a reaction when a solution which does not contain a radioactive element is subjected to the influence of a radioactive reagent which comprises mixing small increments of said reagent with said solution and measuring the radioactivity of the resultant solution after each increment is added to determine a point at which said resultant solution becomes radioactive.

5. The method of determining the end-point of a reaction when a solution is subjected to the influence of a radioactive reagent, said solution containing a radioactive component which is precipitated by said reagent, which comprises mixing small increments of said reagent with said solution and measuring the radioactivity of the resultant solution after each increment is added to determine a point at which the radioactivity of said resultant solution passes from a decreasing to an increasing function of the quantity of reagent added.

6. The method of determining the end-point of a reaction when a solution is subjected to the influence of a non-radioactive reagent, said solution containing a radioactive component which is precipitated by said reagent, which comprises mixing small increments of said reagent with said solution and measuring the radioactivity of the resultant solution after each increment is added to determine a point at which the radioactivity of said resultant solution disappears.

7. The method of determining the end-point of a reaction when a solution is subjected to the influence of a reagent which comprises adding a small quantity of a radioactive ions of an element in said reagent to said reagent, mixing small increments of said reagent with said solution and measuring the radioactivity of one of the resultants of the reaction after each increment is added to determine a point at which an abrupt change in said radioactivity occurs.

8. The method of determining the end-point of a reaction when a solution is subjected to the influence of a reagent which comprises adding a small quantity of a radioactive ions of an element in the original solution, to the original solution, mixing small increments of said reagent with said solution and measuring the radioactivity of one of the resultants of the reaction after each increment is added to determine a point at which an abrupt change in said radioactivity occurs.

ALOIS LANGER.